Figure 1:
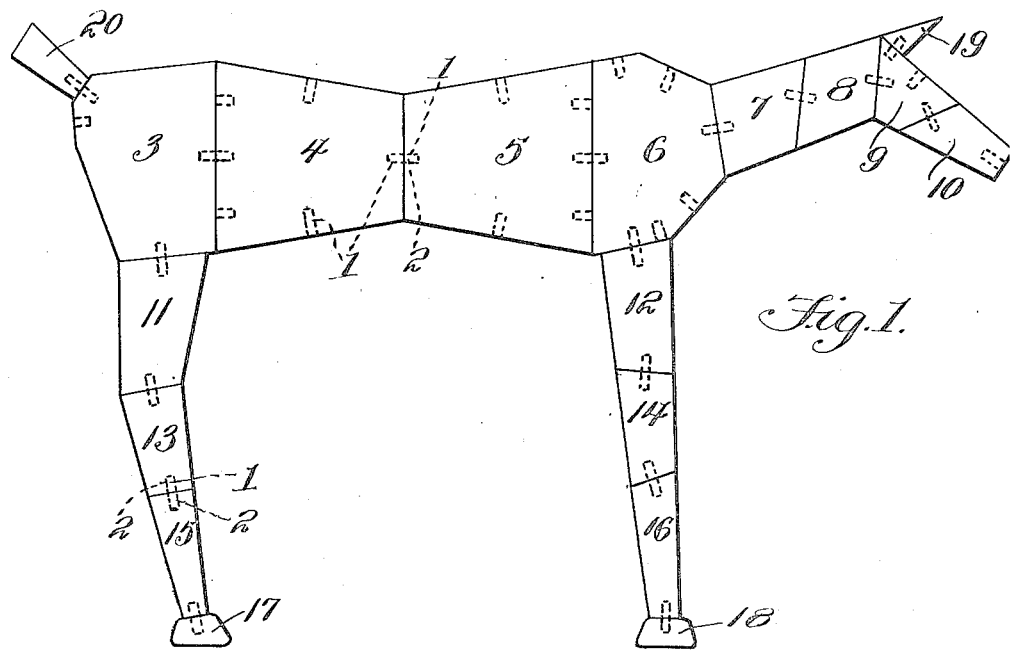

F. W. HEATLIE.
FIGURE TOY.
APPLICATION FILED JULY 25, 1916.

1,229,953.

Patented June 12, 1917.
2 SHEETS—SHEET 1.

Witness
J. T. L. Wright

Inventor
F. W. Heatlie
By Victor J. Evans
Attorney

F. W. HEATLIE.
FIGURE TOY.
APPLICATION FILED JULY 25, 1916.
1,229,953.
Patented June 12, 1917.
2 SHEETS—SHEET 2.
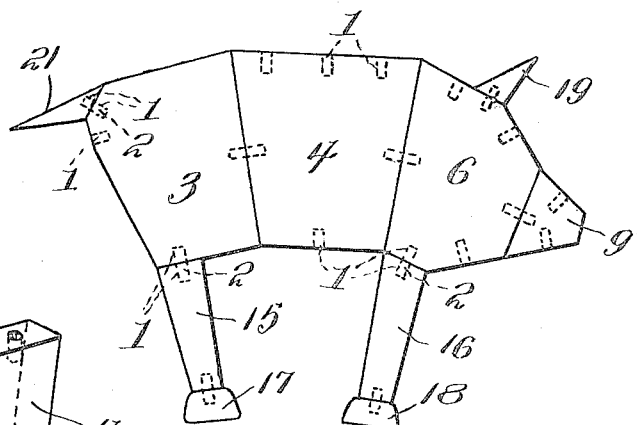
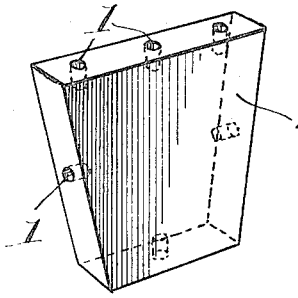
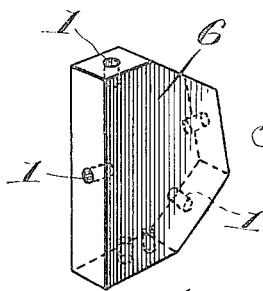
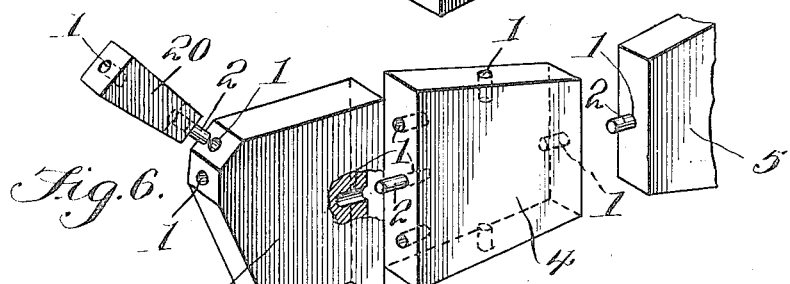
Inventor
F. W. Heatlie
By Victor J. Evans
Attorney
Witness
J. T. L. Wright

UNITED STATES PATENT OFFICE.

FRED W. HEATLIE, OF KENTLAND, INDIANA.

FIGURE TOY.

1,229,953.   Specification of Letters Patent.   Patented June 12, 1917.

Application filed July 25, 1916. Serial No. 111,240.

*To all whom it may concern:*

Be it known that I, FRED W. HEATLIE, a citizen of the United States, residing at Kentland, in the county of Newton and State of Indiana, have invented new and useful Improvements in Figure Toys, of which the following is a specification.

This invention relates to toys.

In carrying out my invention it is my purpose to produce a toy comprising a plurality of flat irregular shaped blocks adapted to be assembled so as to bring two of their ends in contacting position, whereby to produce a complete design of the outline of an object or figure, and whereby certain of the blocks employed in simulating the figure of, say, one animal may be reassembled and blocks added thereto or taken away therefrom and reassembled to produce the outline of a different species of animal, all of the edges of the blocks having openings which register when the said blocks are brought edge to edge and the said alining openings adapted to receive dowel pins, whereby the figure may be maintained in a set-up condition.

Figure 2:
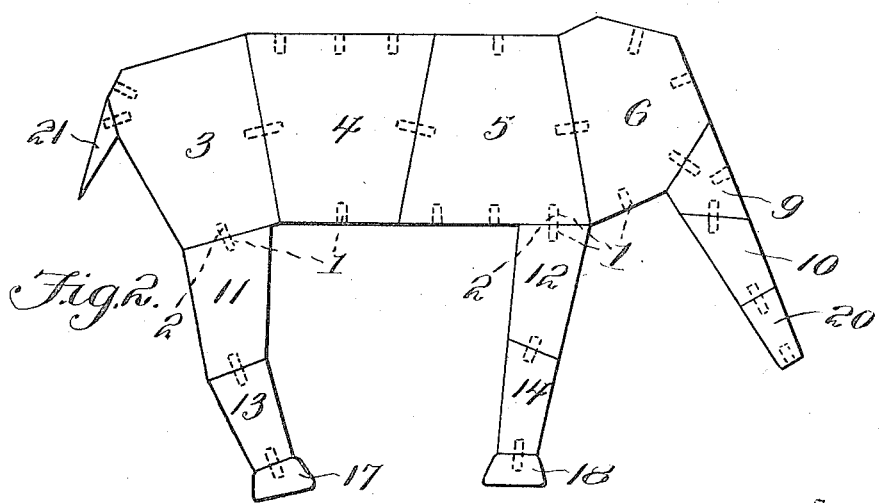

In the drawings illustrating a reduction of the improvement to practice,

Figure 1 is an elevation of the blocks assembled and connected to produce the figure of a horse, Fig. 2 is a view illustrating certain of the blocks employed for producing a figure shown in Fig. 1 arranged to simulate the figure of an elephant, Fig. 3 is a view illustrating certain of the blocks assembled to simulate the figure of a pig or hog, Fig. 4 is a perspective view of one of the blocks, Fig. 5 is a similar view of another block, and Fig. 6 is a detail perspective view illustrating the manner of connecting the assembled blocks.

In the construction illustrated by the drawings eighteen blocks are the maximum number employed in producing the toys disclosed by the said drawings, but it is to be understood that I am not to be limited to the employment of any specific number of the said blocks, the eighteen blocks referred to are employed in the construction of the figure of a horse illustrated in Fig. 1 of the drawings, and of these the ear, tail and hoofs need not be included in the arrangement of the blocks to simulate the figures or objects which may be constructed by my improvement. The blocks are each of an equal thickness throughout but have their edges cut at different angles and the said edges are each provided with one or a plurality of depressions 1 which are adapted to register when the blocks are brought edge to edge and which depressions are adapted to receive dowel pins 2 whereby the blocks are connected to sustain the toy in its set up condition. The blocks are so constructed that the members 3 thereof may be employed for forming the rump or hind quarters of all of the animals illustrated in the drawings, while the blocks 4 and 5 which form the body of the horse in Fig. 1 are moved, when the figure simulating the horse is disassembled, so that their longer edges will contact and be connected to produce the form of the animal illustrated in Fig. 2 of the drawings, while in Fig. 3 only one of either of the blocks 4 or 5 is employed to produce the body of the animal therein shown. As disclosed in Fig. 1 the block 6 producing both the head and neck of the animals illustrated in Figs. 2 and 3 and the block members 7 and 8 employed for forming the neck of the animal in Fig. 1 are dispensed with when the blocks are set up to simulate the animals illustrated in Figs. 2 and 3. The block 9, employed for producing the upper portion of the head of the animal in Fig. 1 is employed for producing the upper end of the trunk in the animal illustrated in Fig. 2 and for producing the snout of the animal illustrated in Fig. 3. The block 10 employed for producing the lower portion of the face of the animal in Fig. 1 provides the intermediate section of the trunk of the animal illustrated in Fig. 2 and is dispensed with in producing the figure of the animal illustrated in Fig. 3. The blocks producing the upper portions of the rear legs and the upper portions of the front legs, indicated for distinction by the numerals 11 and 12 respectively employed in Fig. 1 are employed for a like purpose in producing the design illustrated in Fig. 2, but these blocks are dispensed with in producing the figure of the animal illustrated in Fig. 3, and likewise the blocks 13 and 14 employed for producing the intermediate sections of the rear and front legs of the animal in Fig. 1 are employed for producing the lower leg sections of the figure of the animal disclosed in Fig. 2 and are dispensed with in constructing the figure of the animal disclosed in Fig. 3. The blocks producing the lower portion of the hind and front legs of the figure of the animal disclosed in Fig. 1 and illustrated by the numerals 15 and 16 respectively are employed for producing the whole of the hind and front legs of the figure of the animal in Fig. 3, and the hoof members 17 and 18 respectively may be employed in the figures of all of the animals. The blocks providing the ears 19 in the figure disclosed in Fig. 1 of the drawings are employed for a similar purpose in Fig. 3 of the drawings, while the tail block 20 of the said Fig. 1 is dispensed with and a separate block substantially similar to the ear blocks are employed for producing the tail members 21 in both Figs. 2 and 3.

In a construction as above described it will be seen that by arranging different numbers of the blocks end for end the general outline of a great number of different animals or figures may be produced and the animals may be retained in their set up position by the connecting dowel pins. The improvement is not only contemplated as an amusement device but is also designed to be instructive to children who, having in mind the outline of a particular animal, can, by the proper arrangement of the blocks, produce a figure simulating that of the said animal.

Having thus described the invention, what I claim is:

A figure toy comprising blocks adapted when certain of the edges thereof are brought to aline and removably connected to represent the complete outline of the figure of an animal and when certain other edges of the blocks are brought together to represent the outlines of other and different animals, including the polygonal or six-edged blocks 3 and 6, the trapezoidal blocks 4, 5, 13, 15 and 20, the trapezial blocks 7, 8, 9, 10, 11, 12, 14, 16, 17 and 18, and the substantially triangular blocks 19 and 21.

In testimony whereof I affix my signature.

FRED W. HEATLIE.